United States Patent [19]

Ludwig

[11] Patent Number: 5,015,294

[45] Date of Patent: May 14, 1991

[54] COMPOSITION SUITABLE FOR INJECTION MOLDING OF METAL ALLOY, OR METAL CARBIDE POWDERS

[75] Inventor: David C. Ludwig, Towanda, Pa.

[73] Assignee: GTE Products Corporation, Stamford, Conn.

[21] Appl. No.: 504,207

[22] Filed: Apr. 4, 1990

[51] Int. Cl.$^5$ .................... C08L 91/06; B29C 45/00; B29B 11/08
[52] U.S. Cl. .................................. 106/268; 425/542
[58] Field of Search .................... 106/268; 425/542

[56] References Cited

U.S. PATENT DOCUMENTS

| | | | |
|---|---|---|---|
| 2,638,411 | 5/1953 | Thompson et al. | 106/268 |
| 4,011,291 | 3/1977 | Curry | 264/43 |
| 4,158,688 | 6/1979 | Pett et al. | 264/63 |
| 4,158,689 | 6/1979 | Pett et al. | 264/63 |

*Primary Examiner*—Theodore Morris
*Assistant Examiner*—Mary C. DiNunzio
*Attorney, Agent, or Firm*—Elizabeth A. Levy

[57] ABSTRACT

A composition is disclosed which is suitable for injection molding of metallic material. The composition comprises about 2.8% of about 4.5% by weight of a binder and the balance a metallic material. The binder consists essentially of about 6% to about 14% by weight of a fatty acid and the balance a hydrocarbon wax having a melting point of about 50° C. to about 100° C.

5 Claims, No Drawings

COMPOSITION SUITABLE FOR INJECTION MOLDING OF METAL ALLOY, OR METAL CARBIDE POWDERS

CROSS REFERENCE TO RELATED APPLICATION

This application is related to application Ser. No. 07/504,483, entitled "Composition Suitable For Injection Molding of Ceramic Powders", which is assigned to the same assignee as the present application and which is filed concurrently herewith.

BACKGROUND OF THE INVENTION

This invention relates to compositions suitable for injection molding of metal powders which contain as a binder paraffin and a fatty acid. The binder of the present invention is easily obtained, is relatively uncomplicated as compared with prior known binders, and is as a result, therefore, safer, more economical, and more easily removed during the dewaxing and sintering operation of green articles made from the metals than prior known binder systems. Use of the fatty acid results in essentially complete wetting of the material during compounding. This results in the resulting green article being uniform in composition throughout.

Sinterable materials may be formed into shapes by various processes. Injection molding is a process wherein a material can be formed into a shape by forcing the material into a mold or die by applying a pressure to the fluidized material. The injection molding process facilitates a rapid and repeated forming of a plurality of articles having a consistent shape with close dimensional tolerances. The injection molding process minimizes the amount of shaping or machining that may be required to produce a finished article.

Many problems are encountered in the injection molding process for particulate materials which require high solids to binder ratio. Some of the problems which make it difficult to make complex shapes of high solids to binder ratio compositions required in many sinterable materials such as metallic materials, are low green strength of the articles as molded, segregation of the binder from the particulate material during molding and poor green body flexibility.

In addition to the above problems, many binder systems are comprised of various types of polymers, and exotic blends of materials that are removed by heat, solvents, and capillary action. The more complicated the binder system, the more complicated, and often more hazardous is the removal of the binder.

U.S. Pat. No. 4,456,713 relates to a composition for injection molding which comprises a finely divided sinterable material and an organic binder comprising a hydrocarbon wax having a melting point of about 40° C. to about 75° C. and a volatilization temperature of about 150° C. to about 450° C. about 5 to 15% by weight of a thermosetting resin having a thermosetting temperature of about 120° C. to about 160° C., and a surfactant. This binder composition is relatively complicated. Generally this makes the binder harder to remove than a simpler binder would be because more components have to be removed and different temperatures are involved. There are problems associated with thermosetting resins such as the possibility of the resin setting up during compounding or curing at room temperature while standing. This leads to problems with reusing sprues and runners and in reprocessing of scrap material.

SUMMARY OF THE INVENTION

In accordance with one aspect of the invention, there is provided a composition which is suitable for injection molding of metallic material. The composition comprises about 2.8% to about 4.5% by weight of a binder and the balance a metallic material. The binder consists essentially of about 6% to about 14% by weight of a fatty acid and the balance a hydrocarbon wax having a melting point of about 50° C. to top about 100° C.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The present invention provides a composition suitable for injection molding of metallic material which can be metals, metal alloys and metal carbides which includes a relatively uncomplicated binder system made up of a hydrocarbon wax which can be paraffin, and a fatty acid. The binder is safe, easily obtained, economical, easily removed. Use of the fatty acid results in essentially complete wetting of the metal or alloy during compounding. The composition is easily moldable.

The metallic materials that are best suited to the practice of the present invention although the invention is not limited to these are rapidly solidified powders, milled powders, or spray dried powders. The materials are typically metals, metal alloys, or metal carbides. Some preferred materials are tungsten carbide containing cobalt, tungsten alloys, and maraging steels (Fe, Co, Ni, and Mo). One typical type of material is tungsten carbide contaiing cobalt which is prepared by standard milling and spray drying methods.

The hydrocarbon wax has a melting point of about 50° C. to about 100° C. The preferred hydrocarbon wax is paraffin wax. The paraffin wax is available commercially. Some preferred types of paraffin are supplied by Astor Chemical Co. under the designation 1865Q, by Fisher Chemical Co. under the designation P-21, by Roger Reed Co. having a melting point of about 125° F. to about 165° F., by Shell Oil Co. designated as Shell wax 120, and by Amoco Oil Co. designated as Parawax.

p The fatty acid can be any type generally. The preferred fatty acids are oleic acid, stearic acid, and combinations of these. The fatty acid content serves as a surfactant and aids to producing a uniform intimate mixture of the metallic powder and the binder.

The binder content in the composition is about 2.8% to about 4.5% by weight of the composition with about 3.3% to about 3.8% by weight being preferred. The binder itself is made up of about 6% to about 14% by weight of a fatty acid with about 9% to about 11% by weight being preferred with the balance being the paraffin.

The metallic powder and the binder composition are compounded to form an intimate mixture. This is done by techniques known in the art. One preferred method, is by mixing the metallic powder and binder components in an ABBE two bladed dispersion mixture. The mixing chamber is heated to normally about 110° C. Mixing is continued until the mixture has a homogeneous appearance. About 2 hours mixing time subsequent to the initial blending of the material and binder materials is sufficient. At this point a vacuum is applied and the mixing is continued for about an additional 30 minutes to remove any entrapped air. The resulting mixture can be pelletized or granulated according to well known techniques to a relatively uniform particle size suitable as feed for an injection molding apparatus.

In injection molding applications, the molding is accomplished by known techniques. Injection molding is usually carried out utilizing the transfer method or the direct injection method. In the transfer method a hydraulic press forces the material from a heated storage chamber, by means of a plunger, through sprues or runners, into a mold. In the direct injection method, the heated mixture is forced directly into the mold, through runners and gates, by either a hydraulic plunger or by reciprocating screw equipment. Either method can be utilized.

Compounding of the binder of the present invention with tungsten carbide containing cobalt, for example, takes about 2 hours, whereas compounding a resin containing binder takes about 4 hours. Furthermore, the removal of the binder of the present invention takes takes considerably less time and is less complicated than the resin containing binder. For example the removal of the binder of the present invention takes about 13 hours as opposed to about 31 hours to remove the resin containing binder. Furthermore with a resin containing binder, there is danger of overheating due to shear, in compounding thereby causing the resin to set-up. With the binder of the present invention, this danger does not exist.

While there has been shown and described what are at present considered the preferred embodiments of the invention, it will be obvious to those skilled in the art that various changes and modifications may be made therein without departing from the scope of the invention as defined by the appended claims.

What is claimed is:

1. A composition suitable for injection molding of metallic material, said composition comprising about 2.8% to about 4.5% by weight of a binder and the balance a metallic material, said binder consisting essentially of about 6% to about 14% by weight of a fatty acid and the balance a hydrocarbon wax having a melting point of about 50° C. to about 100° C.

2. A composition of claim 1 wherein said metallic material is selected from the group consisting of metals, alloys, and metallic carbides.

3. A composition of claim 2 wherein said metallic material is selected from the group consisting of tungsten carbide containing cobalt, tungsten alloys, and maraging steels.

4. A composition of claim 1 wherein said fatty acid makes up about 9% to about 11% by weight of said binder.

5. A composition of claim 1 wherein said fatty acid is selected from the group consisting of stearic acid, oleic acid, and combinations thereof.

* * * * *